United States Patent [19]

Blaauw et al.

[11] Patent Number: 4,524,091
[45] Date of Patent: Jun. 18, 1985

[54] METHOD OF PREPARING TIO2 THICK FILM PHOTOANODES FOR PHOTOELECTROCHEMICAL CELLS

[75] Inventors: Cornelis Blaauw; Hussein M. Naguib, both of Kanata; Syed M. Ahmed; Ahmad Aftab, both of Ottawa, all of Canada

[73] Assignee: Canadian Patents and Development Limited-Societe Canadienne des Brevets et d'Exploitation Limitee, Ottawa, Canada

[21] Appl. No.: 421,507

[22] Filed: Sep. 22, 1982

[30] Foreign Application Priority Data

May 28, 1982 [CA] Canada .................................. 403995

[51] Int. Cl.$^3$ .............................................. B05D 5/12
[52] U.S. Cl. ...................................... 427/74; 427/82; 29/569 R; 429/111
[58] Field of Search ............... 427/74, 82; 29/569 R; 429/111

[56] References Cited

U.S. PATENT DOCUMENTS

| | | | |
|---|---|---|---|
| 3,650,815 | 3/1972 | Ghoshtagore | 427/82 |
| 3,899,333 | 8/1975 | Berman et al. | 252/501 |
| 4,029,566 | 6/1977 | Brandmair et al. | 204/290 R |
| 4,090,933 | 5/1978 | Nozik | 429/111 |
| 4,117,210 | 9/1978 | Deb et al. | 429/111 |
| 4,124,464 | 11/1978 | Miyatani et al. | 429/111 |
| 4,144,147 | 3/1979 | Jarrett et al. | 429/111 |
| 4,181,593 | 1/1980 | McKinzie et al. | 427/74 |
| 4,200,474 | 4/1980 | Morris | 29/571 |
| 4,215,155 | 7/1980 | McKinzie et al. | 427/74 |
| 4,216,071 | 8/1980 | Gobrecht | 204/290 R |
| 4,243,503 | 1/1981 | Lieb et al. | 204/290 F |
| 4,252,629 | 2/1981 | Bewer et al. | 204/290 F |

OTHER PUBLICATIONS

"Kinetics and Mechanism of the Anatase/Rutile Transformation, as Catalyzed by Ferric Oxide and Reducing Conditions", Emerson F. Heald and Clair W. Weiss, American Mineralogist vol. 57, pp. 10–23 (1972).

"The Calcination of Titania" by K. J. D. MacKenzie, Trans J. Brit. Ceram. Soc. 74 (1975), pp. 29–34, 77–84 and 127–134.

"Kinetics of the Anatase-Rutile Transformation" by Robert D. Shannon and Joseph A. Pask, J. Amer. Ceram. Soc. 48 (1965), 391.

"Low Frequency Characteristics of TiO$_2$ (Rutile)--Glass Thick Films" by B. Licznerski and K. Nitsch, Electrocomponent Sci. & Tech. 4 (1977), 1.

"Grain Growth and Phase Transformation of Titanium Oxide during Calcination" by Yoshio Iida and Shunro Oyaki, J. Amer. Ceram. Soc. 44 (1961), 120.

"Thick Film Capacitor with a Rutilium Dielectric" by Ronuald Borek et al., Microelectronics & Reliability 11 (1972), 511.

*Primary Examiner*—John E. Kittle
*Assistant Examiner*—James J. Seidleck
*Attorney, Agent, or Firm*—Larson and Taylor

[57] ABSTRACT

Semiconductive photoanodes formed of titanium dioxide (TiO$_2$) are known for use in photoelectrochemical cells. They have been made by various techniques, including chemical vapor deposition, thermal oxidation or anodic oxidation of thin titanium foils, hot pressing of TiO$_2$ powder, and plasma spraying. The present invention provides a method for the fabrication of TiO$_2$ thick film photoanodes, which method is simple, inexpensive and suitable for mass production of large area plates. The method comprises screen printing a film of conductive material on a clean alumina substrate which is then heated to fuse the conductive material into a conductive layer. A first layer of TiO$_2$ particles in an organic carrier is then screen-printed over the conductive layer, at least 10% of the TiO$_2$ being of anatase form. The structure is then heated to burn off the organic carrier and to transform at least part of the TiO$_2$ from anatase form to rutile form, this resulting in good adhesion of the TiO$_2$ layer to the conductive layer. A second layer of TiO$_2$ is then screen-printed over the first layer and heated, the second layer being provided in case there should be pinholes in the first layer which would adversely affect the anode structure when submersed in an electrolyte. The resulting structure is then heated in a reducing atmosphere, e.g. anhydrous ammonia or hydrogen, to transform the TiO$_2$ to TiO$_{2-x}$ where x is between 0 and 1, to reduce the electrical resistivity of the films.

19 Claims, 10 Drawing Figures

METHOD OF PREPARING TIO₂ THICK FILM PHOTOANODES FOR PHOTOELECTROCHEMICAL CELLS

BACKGROUND OF THE INVENTION

This invention relates to a method of producing a photoanode for use in a photoelectrochemical (PEC) cell.

In its simplest form, a PEC cell consists of two electrodes immersed in an aqueous electrolyte and connected electrically by a wire. One of these electrodes is a metal that does not react chemically with the electrolyte; the other electrode is a semiconductor with one face in contact with the electrolyte and the other face connected to the shorting wire by an ohmic contact. Ideally, when light falls on the semiconductor electrode, oxygen gas is liberated at one electrode and hydrogen is liberated at the other.

The operation of such a cell can be generally explained in terms of electron energy levels in the electrodes and the electrolyte. For an n-type semiconductor photoanode, light incident upon the semiconductor with energy hv greater than the energy gap of the material, $E_g$, results in the generation of an electron-hole pair. This pair is separated by the electric field in the depletion region. Under the influence of this electric field the electrons move away from the surface into the bulk of the semiconductor and then transfer via the external circuit to the metal counter-electrode where they discharge $H_2$ according to the reaction:

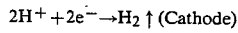

$2H^+ + 2e^- \rightarrow H_2 \uparrow$ (Cathode)

The holes, on the other hand, move to the semiconductor-electrolyte interface and discharge $O_2$ according to the oxidation reaction:

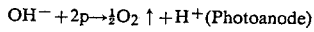

$OH^- + 2p \rightarrow \frac{1}{2}O_2 \uparrow + H^+$ (Photoanode)

For p-type semiconducting photoanodes, a hole depletion region is formed with the photogenerated electrons moving to the semiconductor-electrolyte interface and the holes transferred via the external circuit to the metal counter-electrode (anode). Accordingly, hydrogen is liberated at the semiconductor electrode and oxygen at the metal counter-electrode.

Titanium dioxide (TiO₂) is one of the most commonly used material for making photoanodes in PEC cells. TiO₂ based photoanodes have been fabricated using single crystals of TiO₂ and polycrystalline TiO₂ prepared by a variety of techniques including chemical vapor depositions, thermal oxidation or anodic oxidation of thin Ti foils, hot pressing of TiO₂ powder, and plasma spraying.

TiO₂ is an n-type semiconductor with high electrical resistivity. Conductivity in TiO₂ is induced by heating in a reducing atmosphere which results in the formation of TiO₂₋ₓ, where x takes on a value between 0 and 1. The most common reducing atmosphere is hydrogen, although reduction in vacuum, argon, nitrogen, forming gas and CO/CO₂ mixture is also known to the art.

TiO₂ thick film dielectric materials are well established in the electronic industry for the fabrication of multilayer capacitors. For this application, the TiO₂ thick film contains a high percentage of glass component, varying between 10% and 90%, to provide cohesion of the TiO₂ particles and adhesion of these particles to the substrate. In this case, the as-fired film consists of TiO₂ particles embedded in a glassy matrix and exhibits high dielectric constant as well as high breakdown voltage.

The presence of a glass frit binder in the TiO₂ is an undesirable feature for its use as a photoanode in PEC cells. In this application, the glass component would reduce the active region for the absorption of light in the photoanode and decrease the efficiency of electron transfer at the electrolyte-semiconductor interface. Also, it increases the resistivity of the film which leads to higher ohmic losses in the PEC cells.

U.S. Pat. No. 4,090,933 of Nozik, issued May 23, 1978, describes the basic aspects of a complete photoelectrochemical cell, i.e. the general properties and geometrical configurations of all of the elements of such a cell. The patent does not, however, address the preparation of the electrodes except for the use of TiO₂ in the form of a single crystal or RF sputtered film.

Two other patents relating to similar subject matter are U.S. Pat. Nos. 4,181,593 of McKinzie et al, issued Jan. 1, 1980 and 4,215,155 of McKinzie et al, issued July 29, 1980. These patents disclose the use of undoped and doped polycrystalline n-type TiO₂ as photoanodes in photoelectrochemical cells. The anode preparation procedure generally consists of applying a slurry of a mixture of TiO₂ powder, and other oxides where applicable, with a suitable consistency to paint onto a metal substrate, heating in an oxygen-containing atmosphere at 500°–800° C., and reducing in hydrogen at elevated temperatures. [The present process, however, uses screen printing technology to obtain precisely defined deposition parameters. The same technology may also be used for applying a metal backing onto a ceramic substrate. Also, in the adhesive mechanism used to adhere TiO₂ to the substrate, specific use is made of properties associated with a phase transition (from anatase to rutile) in TiO₂ at elevated temperatures. Thus, the process according to the invention is quite different from those described in these two patents.]

U.S. Pat. No. 4,216,071 of Gobrecht, issued Aug. 5, 1980 describes a cell for electrode deposition in which anodes consist of a metallized ceramic or a metal support covered by a layer of semiconducting material. Various methods of applying the semiconductor layer are mentioned, such as vapour deposition, cathodic sputtering, or coating from a liquid phase. There is, however, no disclosure of the method according to the invention which utilizes screen printing.

SUMMARY OF THE INVENTION

An object of the present invention is to provide, for the first time, a method for the fabrication of screen-printed TiO₂ thick film photoanodes for use in PEC cells. This method is simple, inexpensive and suitable for mass production of large area plates.

Another object of the present invention is to provide a method to prepare TiO₂ thick film photoanodes without the use of the glass binder. This method is based on using TiO₂ powder which has the anatase crystal structure. At elevated temperature (600°–1100° C.), anatase undergoes a phase transformation into the rutile phase. During this transformation process, Ti and O ions move to new sites in the lattice and undergo a high rate of diffusion. This results in sintering of the TiO₂ particles and provides adhesion of these particles to the substrate.

Another object of the present invention is to provide a novel process for producing a photoanode which is simple, inexpensive and suitable for mass production.

The present invention uses screen printing technology to obtain precisely defined deposition parameters. The same technology may also be used for applying a metal backing onto a ceramic substrate. Also, in the adhesive mechanism used to adhere $TiO_2$ to the substrate, specific use is made of properties associated with a phase transition (from anatase to rutile) in $TiO_2$ at elevated temperatures. Thus, the process according to the invention is quite different from those described in U.S. Pat. Nos. 4,181,593 and 4,215,155.

According to a broad aspect of the invention, there is provided a method of producing a photoanode comprising the steps of:

(a) screen printing a film of conductive material on a clean ceramic substrate, (b) heating said substrate and film to fuse said conductive material into a conductive layer, (c) screen printing a layer of $TiO_2$ particles in an organic carrier, over said conductive layer, said $TiO_2$ being at least 10% of anatase form, (d) heating said substrate and layers to burn off said organic carrier and to sinter said $TiO_2$ particles, at least some of which are transformed from anatase form to rutile form, (e) heating the resulting structure in a reducing atmosphere to transform said $TiO_2$ to $TiO_{2-x}$, where x is between 0 and 1.

BRIEF DESCRIPTION OF THE DRAWING

The invention will now be further described in conjunction with the accompanying drawings, in which.

DESCRIPTION OF THE PREFERRED EMBODIMENTS

According to the present invention, thick film $TiO_2$ photoanodes are prepared from pastes that contain no glass binder. The paste consists of $TiO_2$ powder dispersed in a liquid organic vehicle. The $TiO_2$ powder should be in the anatase form or contain a mixture of anatase and rutile phases in the ratio of more than 1:10 and preferably more than 1:1. Before preparing the paste, the $TiO_2$ powder should be passed through a 325 mesh screen to remove any agglomerates larger than 40 $\mu$m, which might interfere in later processes. The $TiO_2$ powder is then combined with a sufficient quantity of a liquid organic vehicle to form a pasty mixture which can be squeezed though a screen stensil. This organic vehicle serves mainly to provide the appropriate rheology for screening but may also contain waxes, thermoplastic resins and the like to provide a degree of screen strength to the film after the organic solvent components have been driven off. A typical organic vehicle consists of a mixture of ethyl cellulose, butyl carbitol acetate and an organic solvent such as iso-pentyle salicylate or $\beta$-terpineol to form a paste with 70–75% solids. The paste viscosity should be adjusted between 310 to 375 poise, preferably 350 poise, to provide optimum screen printing conditions. The paste is preferably smoothed by several passes through a threeroll paste mill at mill gaps approaching 25 $\mu$m on the final pass. Air is removed from the paste by evacuation.

Figure 1A:
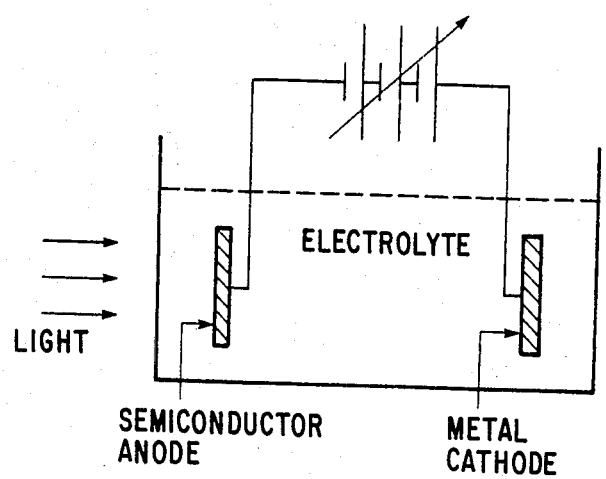
FIG. 1(a) is a schematic representation of a photoelectrochemical (PEC) cell.
Figure 1B:
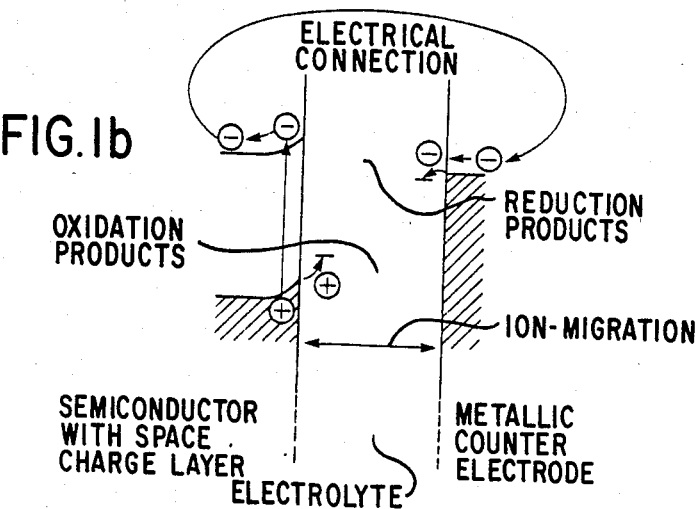
FIG. 1(b) is a diagram illustrating the principle of operation of the PEC cell.
Figure 2:
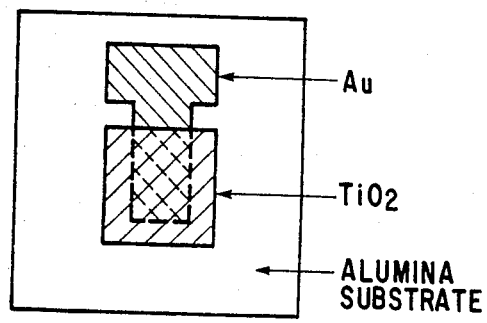
FIG. 2 is a schematic diagram of a $TiO_2$ thick film photoanode.

According to an exemplary embodiment of the present invention, a $TiO_2$ photoanode consists of a $TiO_2$ thick film layer screen-printed and fired on a ceramic substrate, e.g. of 96% alumina. A layer of screen-printed thick film conductor is also included to provide a conducting path to the counter electrode in the PEC cell. A schematic representation of a $TiO_2$ photoanode prepared according to the present invention is shown in FIG. 2. The fabrication of such photoanode comprises the following steps:

1. A 96% alumina ceramic substrate is cleaned using a process developed for thick film substrates (P. G. Creter and E. E. Peters, Proc. ISHM (1977) P. 281) with subsequent ultrasonic cleaning in Freon ® solvent followed by firing at high temperature, typically 900° C. The use of contaminated substrates can result in poor film adhesion.

2. A layer of commercially available thick film conductor such as Au, Pt - Au, Pd - Ag . . . etc. is screen-printed and fired as recommended by its manufacturer. A typical firing condition is a 60 min. cycle in a belt conveyor furnace of which 5–15 min. is at a peak temperature of 850° C. Also, thin or mid-film conductors can be used to form this conductor layer. The conductor may form a continuous layer covering the substrate or may be patterned to reduced the amount of conductor material and thereby reducing the fabrication cost of the photoanodes.

3. A layer of $TiO_2$ thick film prepared as described above is screen-printed through a 200 mesh stainless steel screen so that at least 80% of this layer overlaps the as-fired conductor electrode and a portion of the conductor is left uncovered to provide external electrical contact.

Various screen printing parameters can be adjusted to obtain a uniform layer of $TiO_2$ with minimum pinhole density and an average dried thickness of 20–25 μm. Typical screen printing parameters are: Squeegee pressure of 20–30 psi, squeegee speed of 0.5–2.0 in/sec. and a snap-off distance of 25–30 mils. The screen printed layer is then fired in a thick film belt conveyor furnace for a 60 min cycle of which 5–15 min. are at a peak temperature of 600°–1100° C. The firing temperature corresponds to the temperature at which the anatase—rutile phase transformation occurs. A peak temperature of 850° C is preferable because it is compatible with a standard thick film firing cycle on an alumina substrate. During this firing cycle, the organic vehicle is burned off and the $TiO_2$ particles are sintered together and adhere to the ceramic and metallised substrate. If the paste contains $TiO_2$ powder with the rutile form only, the film is found to exhibit poor adhesion.

Figure 3:
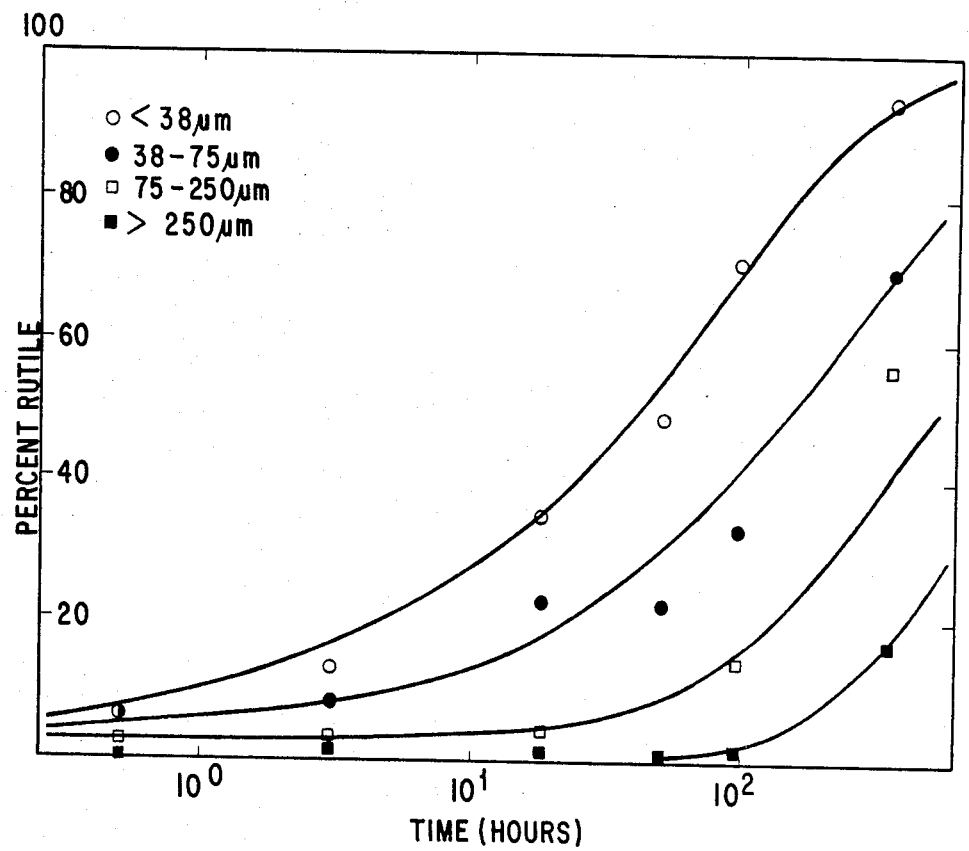
FIG. 3 is a plot showing the fraction of anatase transformed to rutile phase in $TiO_2$ heated in air at 850° C. as a function of the heating time and the particle size of the anatase powder. The percentage of rutile was calculated from the intensity of x-ray spectra of rutile and anatase phases following the method described by R. A. Spurr & H. Meyers (Anal. Chem 29 (1957) 760).

The anatase—rutile phase transformation during the heating cycle has been confirmed using x-ray analysis. The results are shown in FIG. 3 for anatase powder of various particle size. Since the transformation starts at the surface and moves inwards inside a particle, the rate of transformation is faster in small grains than in large ones. Therefore the anatase particle size in the paste should preferably not be greater than 40 μm to achieve a smooth uniform print and to provide a fast transformation rate to the rutile phase and thereby good adhesion to the ceramic substrate.

4. A second layer of $TiO_2$ is screen printed and fired following the same procedure as described in step (3). This layer is desirable to eliminate pinholes in the as-fired film. The existence of such pinholes provides a conducting path between the electrolyte and the conducting layer beneath the $TiO_2$ film. This causes poor performance of the PEC cell.

The final thickness of the $TiO_2$ thick film after the firing of the second layer is approximately 30μm.

Figure 4:
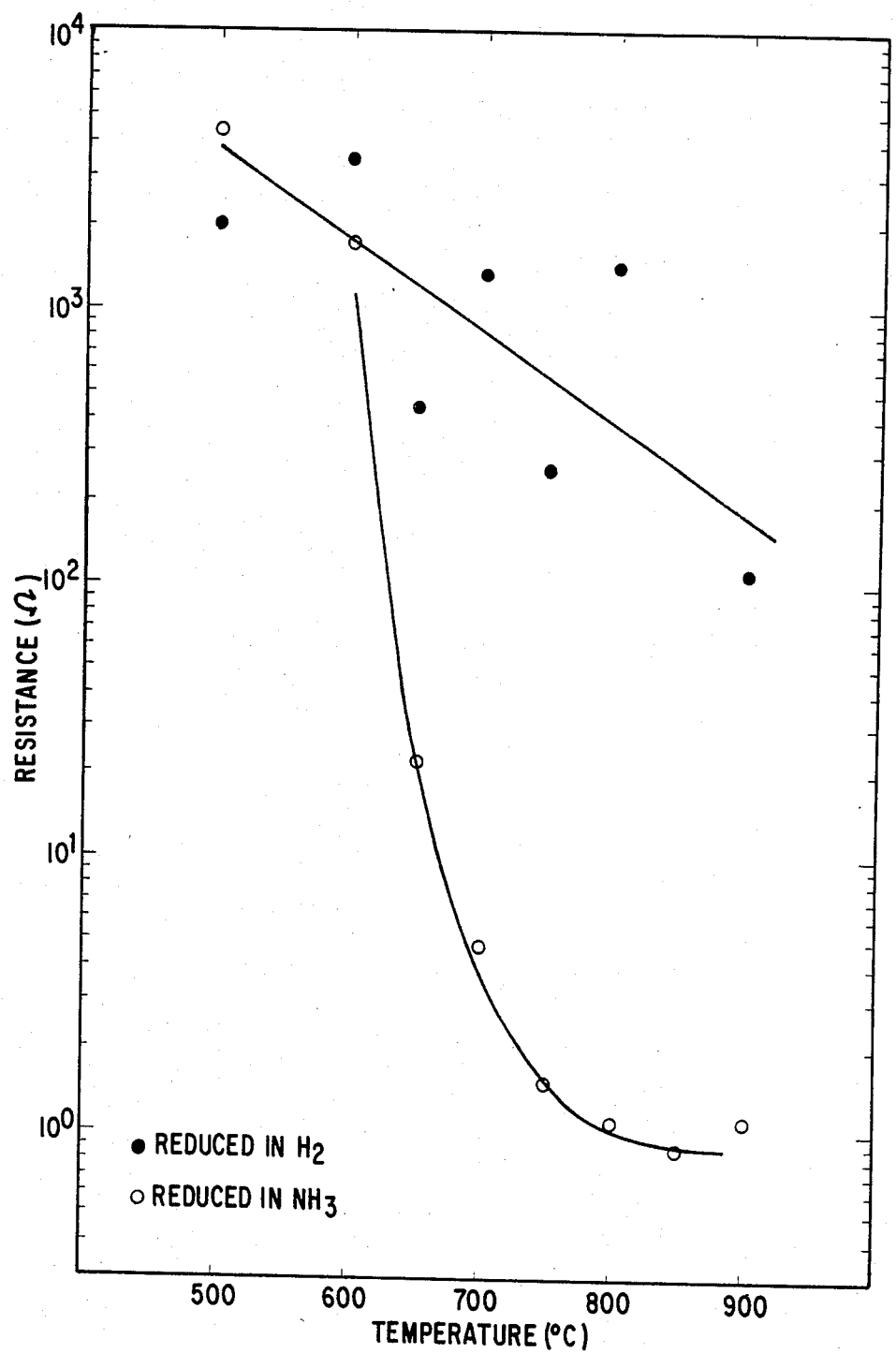
FIG. 4 is a graph of the resistance of $TiO_2$ thick film samples as a function of reduction temperature for one hour reduction in anhydrous ammonia and in hydrogen ($H_2$ - Ar mixture) atmospheres.
Figure 5:
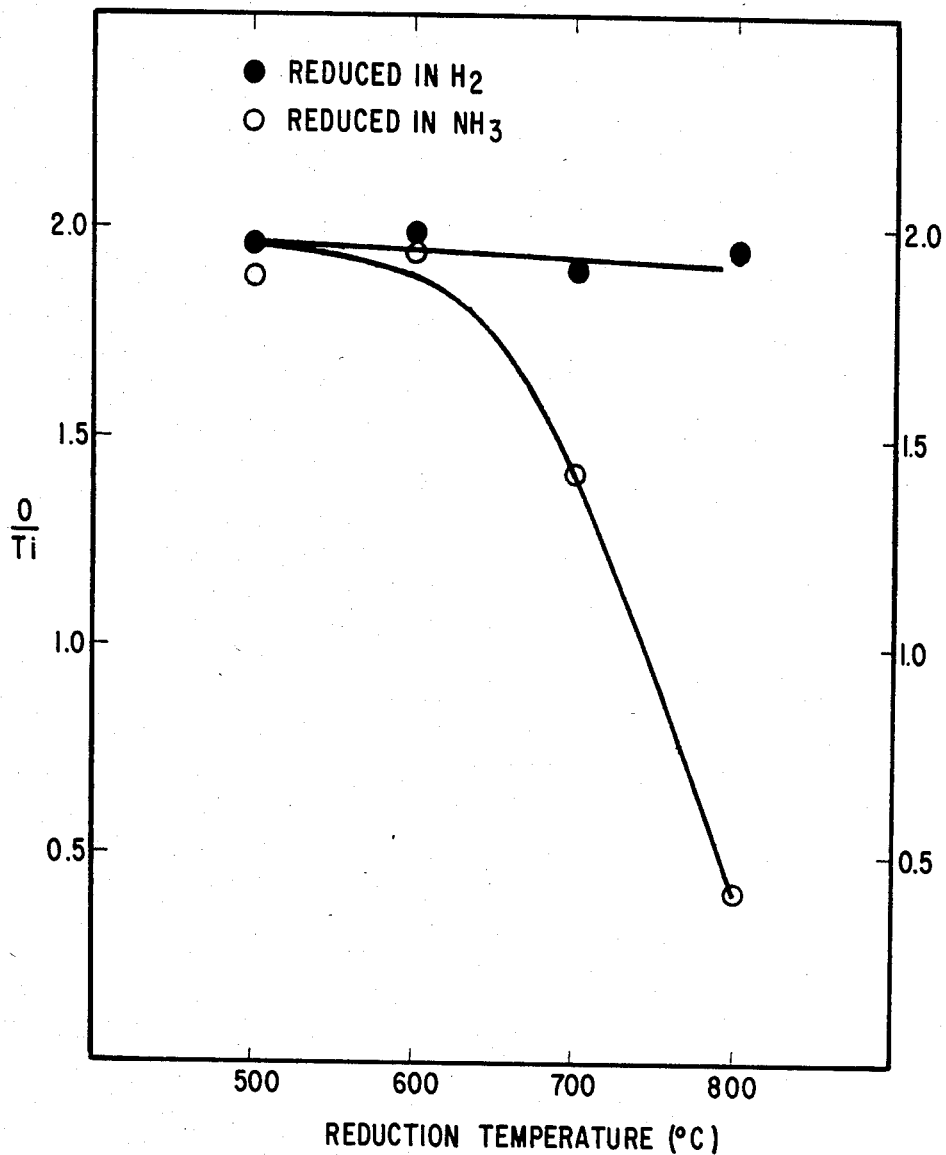
FIG. 5 is a diagram showing the decrease in $O_2$ concentration in thick film $TiO_2$ samples following the reduction cycles of FIG. 4.

5. The as-fired $TiO_2$ thick film photoanodes are then subjected to a heating cycle in a reducing atmosphere such as anhydrous ammonia at a temperature between 500° and 800° C for a period of up to three hours. This reduction step serves to decrease the electrical resistivity of the film as shown for example in FIG. 4. Nuclear microanalysis of the reduced samples indicates a decrease in the amount of $O_2$ in the as-fired film, and the formation of $TiO_{2-x}$ where x varies between 0 and 1. These results are shown in FIG. 5. The reduction can also be undertaken in hydrogen, vacuum, $N_2$, Ar, forming gas or $CO/CO_2$ mixture with similar results.

In the presently preferred method the as-fired $TiO_2$ thick film photoanodes are subjected to a heating cycle in hydrogen atmosphere at a temperature between 500° and 800° C for a period of up to three hours. This reduction step serves to decrease the electrical resistivity of the film as shown in FIG. 4. The use of hydrogen yields a better control over the reduction process than using ammonia. The reduction can be done in a tube furnace with heating and cooling of the photoanodes done in an inert atmosphere such as $N_2$ or $H_2$ or a mixture of $H_2$ and other gases. A particularly simple and effective method of reduction is to place the as-fired photoanodes in a thick film belt conveyor furnace in which an atmosphere of $H_2$ is maintained in the middle, high temperature section of the furnace, and $N_2$ in the end sections. Reduction is done in a firing cycle of 30–90 min of which 5–20 min are at a peak temperature of 500°–900° C.

6. Following the heat treatment step, fabrication of each photo-electrode is completed by attaching a metallic wire (for example Pt, Au, Al or Cu) to the thick film conductor layer. The wire is silver epoxy welded to the thick film conductor electrode and the weld joint is covered with silicon rubber.

Alternatively, a metallic wire can be soldered to the thick film conductor. The solder used will depend on the type of the thick film conductor used.

Figure 6:
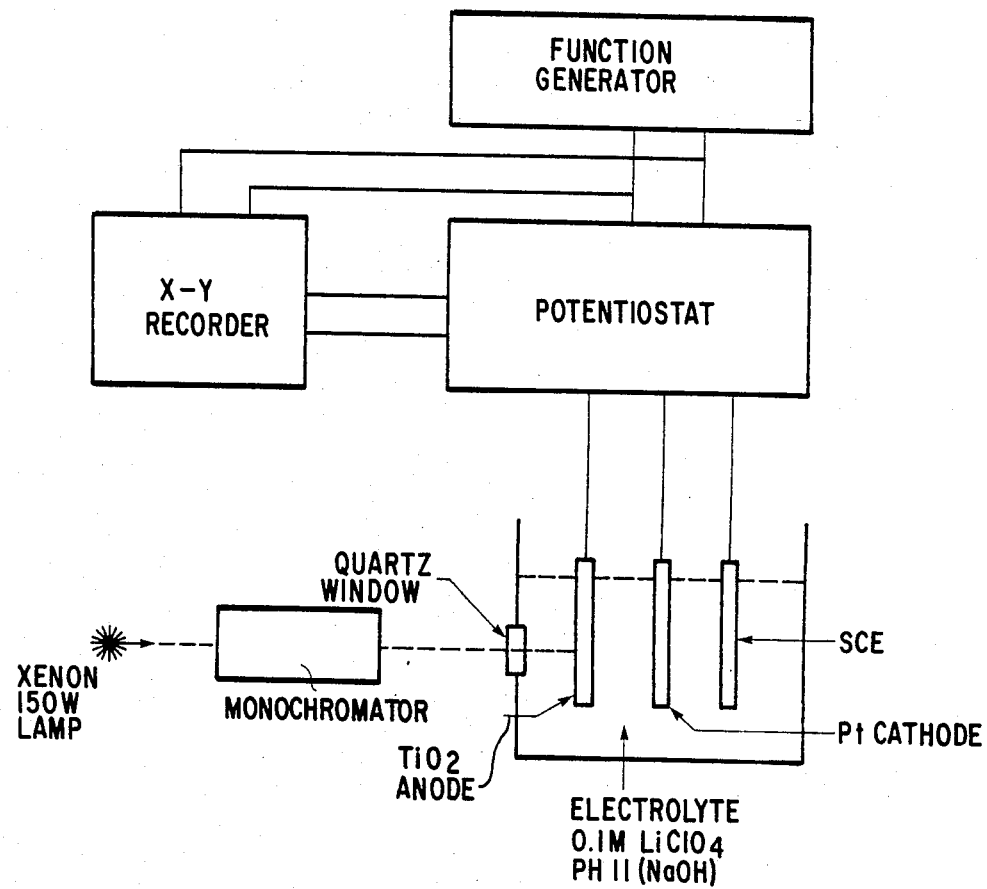
FIG. 6 is a block diagram of an arrangement for measuring the photoelectrochemical characteristics of $TiO_2$ thick film photoanodes in a PEC cell.
Figure 7:
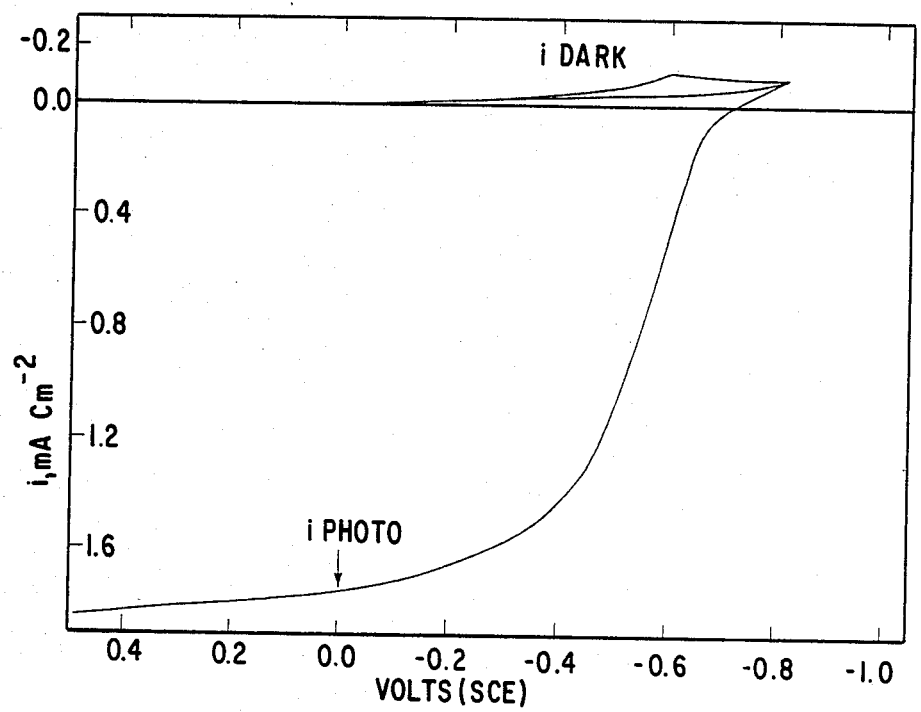
FIG. 7 is a typical diagram of photocurrent ($i_{photo}$) and dark current ($i_{dark}$) versus the potential of the $TiO_2$ thick film anode with respect to a saturated Calomel electrode ($V_{SCE}$)
Figure 8:
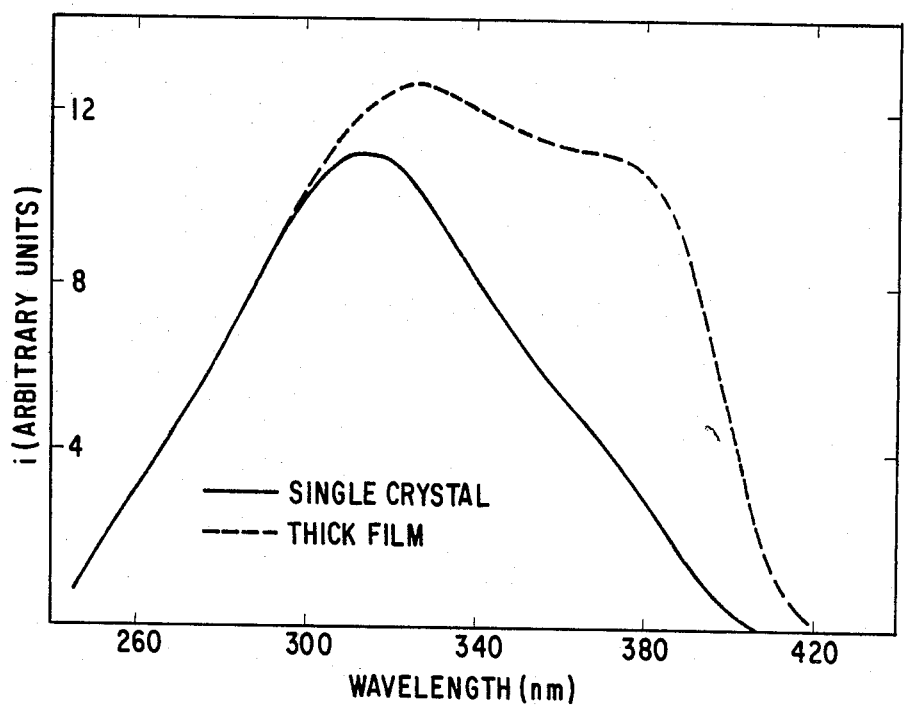
FIG. 8 is a diagram of the spectral photoresponse of an anatase-based thick film photoanode (solid line) and a single crystal rutile photoanode (dashed line), both reduced in hydrogen. The intensity (i) was normalized with respect to the photoresponse at wavelengths of less than 300 nm.

The photoelectrochemical properties of the $TiO_2$ prepared according to the present invention are evaluated by measuring its dark current and photocurrent flow in the PEC system shown in FIG. 6. This consists of the $TiO_2$ electrode, a saturated calomel reference electrode and a Pt counter electrode of 2 cm² surface area. The electrolye solution used is 0.2 M lithium chloride solution ($LiClO_4$) with a pH of 11. Various voltages are applied across the cell as measured between the $TiO_2$ photoanode and the reference electrode. The dark- and photo-current flow between the $TiO_2$ electrode and the Pt counter electrode at each voltage is measured and plotted using an x-y recorder. Typical results are shown in FIG. 7. The photocurrent spectrum of a hydrogen reduced single crystal (rutile) of $TiO_2$ and of a $TiO_2$ thick film photoanode produced by the present method under optimized conditions of doping, sintering and degree of reduction in hydrogen are given in FIG. 8. It is seen that the absorption peak for the film has been extended beyond the value of 310 nm of the single crystal, so that about 30% more energy is usefully absorbed by the film compared to the single crystal.

The PEC characteristics of a typical cell with the $TiO_2$ thick film anode produced by the present method are as follows:

The cell resistance in 1M NaOH with the electrodes 1 cm apart $\simeq 25 \Omega$.

The open circuit photovoltage equals 700–800 mV.

Overall sunlight conversion efficiency (adiabatic) $\eta$, calculated as $$\eta = i_{s.c.} (1.48 - V_b) \times 100/P_{in}$$

with $i_{s.c.}$ = short circuit photocurrent
$V_b$ = bias voltage
$P_{in}$ = power of incident light For thick film photoanodes reduced in $H_2$ at 700° C., a sunlight conversion efficiency of 2.5% was obtained using a 200 mV anodic bias under potentiostatic conditions. Rutile single crystal electrodes reduced under the same conditions gave 1.3% efficiency.

The improved PEC characteristics of the screen-printed thick films are attributed to a number of factors. These include the nature of the internal (porous) structure of the thick films, the existence of a high level of certain beneficial impurities, low contact resistance of the back metallization interface, high absorption surface with large semiconductor/electrolyte interface, and the presence of a residual anatase layer at the film surface. However, it has not been possible to determine the relative importance of each of these parameters on the PEC behaviour of $TiO_2$ thick film photoanodes.

Various dopants can be used to improve the PEC characteristics of $TiO_2$ photoanodes. The solar conversion efficiency of pure $TiO_2$ photoanodes is limited by the fact that its large optical bandgap (3.0 eV) prohibits the absorption of radiation with a wavelength larger than 400 nm. Thus only about 3% of the solar energy spectrum can be utilised in a $TiO_2$ photoanode. Attempts have been made to modify the optical absorption properties by the introduction of dopant elements into the $TiO_2$ structure. The underlying rationale for this work is that these dopants will introduce occupied energy states within, or otherwise modify, the $TiO_2$ bandgap and facilitate optical transitions from these states to the conduction band at wavelength $\lambda > 400$ nm. This will extend the usable part of the solar energy spectrum into the visible region. Several investigations have dealt with the use of doped $TiO_2$ photoanodes.

Dopant or modifier materials which have been found to be effective possess some solid state solubility in $TiO_2$ and/or an impurity band lying within the energy band gap of $TiO_2$. Oxides of metals selected from the group consisting of aluminum and d-electron transition metals have been found to be most effective.

According to the present invention, when using dopants, $TiO_2$ thick film paste is first prepared as described above. For the preparation of photoanodes containing dopant elements, these elements are then added to the paste. They can be in the form of a metal powder or a metal oxide or a different chemical compound which upon firing in air is converted into an oxide. The dopant powders are first passed through a 400 mesh screen to remove particles larger than 40 μm. The dopant powders are added to the paste in quantities varying from 1 to 20% of the $TiO_2$ present. More liquid organic vehicle should be added to readjust the paste viscosity. The paste is then printed, fired and reduced as previously described.

Preferably, the dopant elements are incorporated into the $TiO_2$ anatase structure before using this in a thick film paste. This gives better control over the concentration of dopants in the $TiO_2$ lattice.

Figure 9:
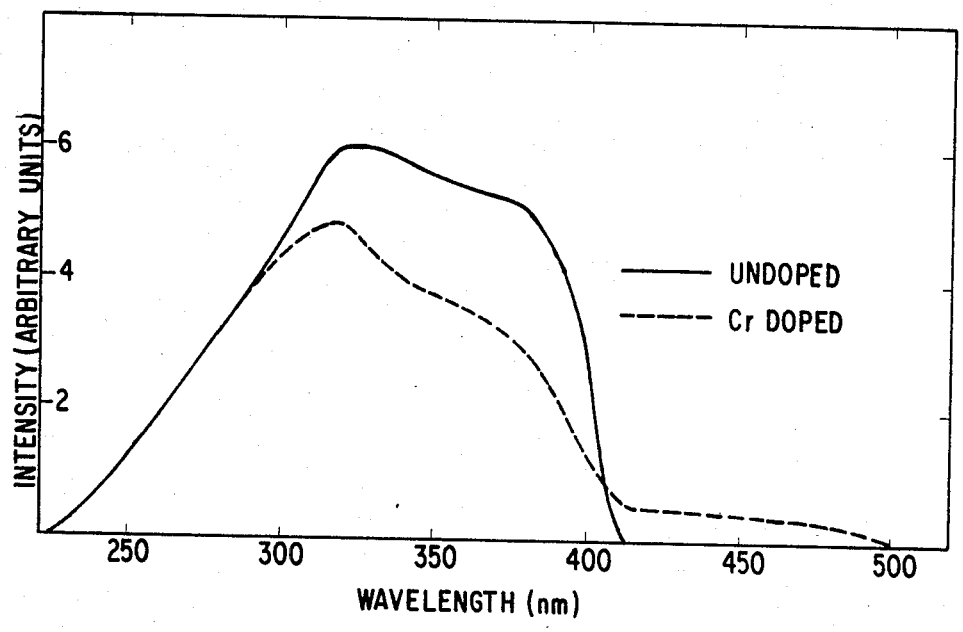
FIG. 9 is a diagram of the spectral photoresponse of anatase-based thick film photoanodes prepared with the addition of Cr to the paste (dashed line) and without the addition of Cr (solid line). The intensity was normalized with respect to the photoresponse of wavelengths of less than 300 nm.

It has been found that doped $TiO_2$ electrodes according to the present invention absorb light of wavelength 40–70 nm further into the long wavelength region of the light spectrum than undoped, polycrystalline electrodes of the prior art. Typical spectral photoresponse of Cr doped anatase-based thick film prepared according to the present invention is shown in FIG. 9.

What is claimed is:

1. A method of producing a photoanode comprising the steps of:
   (a) screen printing a film of conductive material on a clean ceramic substrate,
   (b) heating said substrate and film to fuse said conductive material into a conductive layer,
   (c) screen printing a layer of $TiO_2$ particles no larger than about 40 μm in an organic carrier, over said conductive layer so that some area of said $TiO_2$ is directly bonded to said ceramic substrate, said $TiO_2$ being a mixture of rutile and anatase forms in a ratio of more than 1:10 to 1:1,
   (d) heating said substrate and layers to burn off said organic carrier and to sinter said $TiO_2$ particles, at least some of which are transformed from anatase form to rutile form,
   (e) heating the resulting structure in a reducing atmosphere to transform said $TiO_2$ to $TiO_{2-x}$, where x is between 0 and 1.

2. A method of producing a photoanode comprising the steps of:
   (a) screen printing a film of conductive material on a clean ceramic substrate,
   (b) heating said substrate and film to fuse said conductive material into a conductive layer,
   (c) screen printing a layer of $TiO_2$ particles no larger than about 40 μm in an organic carrier, over said conductive layer so that some area of said $TiO_2$ is directly bonded to said ceramic substrate, said $TiO_2$ being a mixture of rutile and anatase forms in a raio of more than 1:10 to 1:1,
   (d) heating said substrate and layers to burn off said organic carrier and to sinter said $TiO_2$ particles, at least some of which are transformed from anatase form to rutile form,
   (e) screen printing a second layer of $TiO_2$ particles in an organic carrier over said first layer, said particles being at least 10% of anatase form,
   (f) heating said substrate and layers to burn off said organic carrier and to sinter the $TiO_2$ particles in said second layer, at least some of which are transformed from anatase form to rutile form, and
   (g) heating the resulting structure in a reducing atmosphere to transform said $TiO_2$ to $TiO_{2-x}$, where x is between 0 and 1.

3. A method as claimed in claim 1 or 2 wherein said organic carrier comprises a mixture of ethyl cellulose, butyl carbitol acetate and an organic solvent selected from the group comprising iso-pentyl salicylate and β-terpineol.

4. A method as claimed in claim 1 or 2 wherein said ceramic substrate comprises substantially 96% alumina.

5. A method as claimed in claim 1 or 2 wherein said conductive material is selected from the group comprising gold, platinum, palladium, silver and mixtures thereof.

6. A method as claimed in claim 1 wherein, in step (b), heating occurs for approximately 60 min., of which 5–15 min is at a peak temperature of about 850° C.

7. A method as claimed in claim 2 wherein said first layer of $TiO_2$ covers at least 80% of the conductive layer and a portion of the conductor is left uncovered to provide external electrical contact.

8. A method as claimed in claim 7 wherein each of said first and second layers have an average dried thickness of 20–25 μm.

9. A method as claimed in claim 7 wherein the heating in step (d) is carried out for about 60 min. of which about 5–15 min is at a peak temperature of 600°–1100° C.

10. A method as claimed in claim 9 wherein said peak temperature is about 850° C.

11. A method as claimed in claim 10 wherein said particles have an average size of less than 10 μm.

12. A method as claimed in claim 1 or 2 wherein said reducing atmosphere is anhydrous ammonia.

13. A method as claimed in claim 5, 6 or 10 wherein said reducing atmosphere is anhydrous ammonia.

14. A method as claimed in claim 1 or 2 wherein said reducing atmosphere is hydrogen.

15. A method as claimed in claim 7, 8 or 11 wherein said reducing atmosphere is hydrogen.

16. A method as claimed in claim 1 or 2 and further comprising the step of attaching a conductive wire to the conductive layer.

17. A method as claimed in claim 7, 8 or 11 and further comprising the step of attaching a conductive wire to the conductive layer.

18. A method as claimed in claim 2 wherein said layers of $TiO_2$ include dopant materials to modify the optical absorption of the layers.

19. A method as claimed in claim 7, 8 or 11 wherein said layers of $TiO_2$ include dopant materials to modify the optical absorption of the layers.

* * * * *